United States Patent Office 3,281,740
Patented Oct. 25, 1966

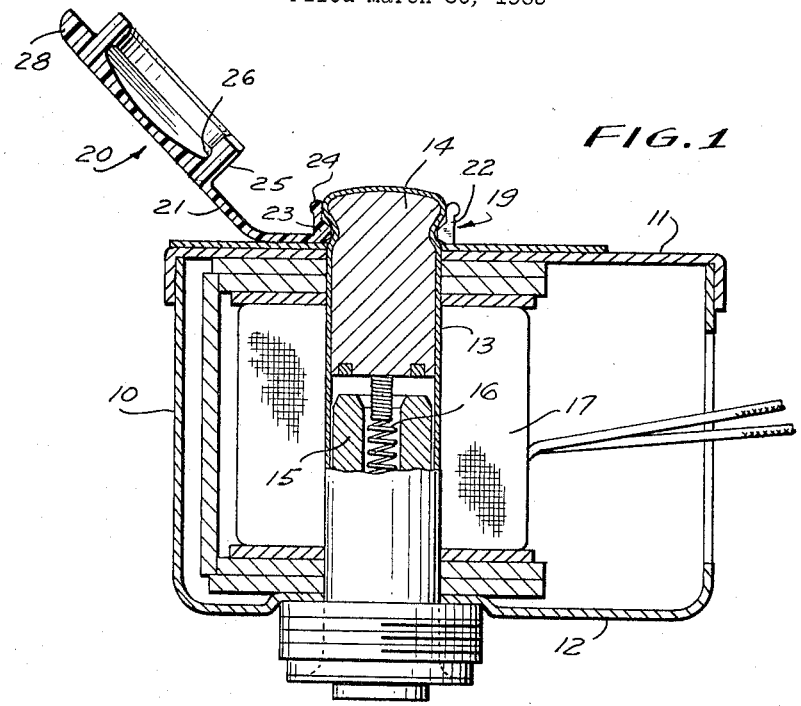
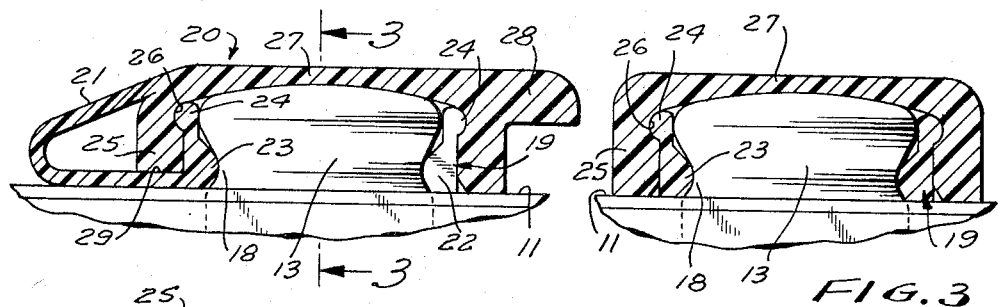
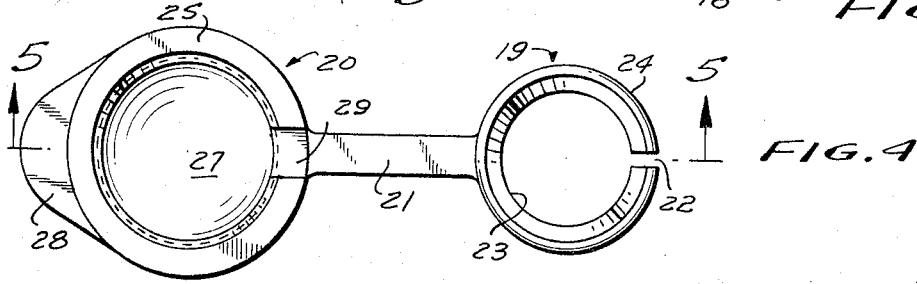
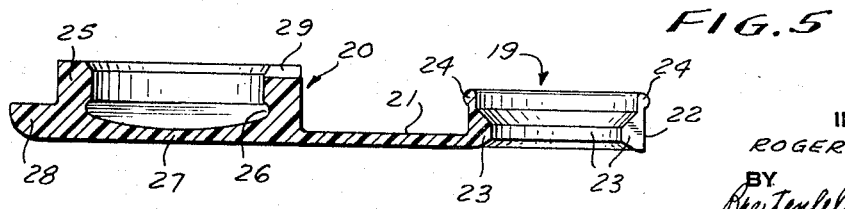
INVENTOR:
ROGER G. RIEFLER
BY
Breitenfeld & Levine
ATTORNEYS

3,281,740
CLAMPING MEANS FOR A SOLENOID ASSEMBLY
Roger G. Riefler, Kinnelon, N.J., assignor to Automatic Switch Company, Florham Park, N.J., a corporation of New York
Filed Mar. 30, 1965, Ser. No. 443,945
4 Claims. (Cl. 335—255)

This invention relates generally to solenoid assemblies, and has particular reference to the securement to a solenoid core tube of the housing in which the solenoid is enclosed.

It is common practice for a solenoid core tube to be arranged within a housing so that its ends project outwardly beyond two opposed walls of the housing. One end is open, for transmission of the movements of the solenoid core to the valve or other mechanism to be controlled. The other end is closed, and is clamped so as to secure it in position with respect to the adjacent housing wall. Springy wires and the like, encircling the core tube and retained within an annular groove, have often been used for the purpose. It is a general object of the present invention to provide an improved means for clamping or gripping the end of the core tube.

Among the more particular objectives are the provision of a clamping or retaining means which is readily applied during the manufacture of the solenoid assembly, whose application requires no special tools, which is resiliently yieldable so that it is effective to take up slack due to dimensional variations in the core tube and housing, and which engages the tube firmly and reliably, is practically irremovable after it has been installed, and is not subject to loosening or removal under conditions of shock or vibration.

The improved retaining means thus overcomes numerous shortcomings of clamps and the like heretofore used, and it imparts added advantages to the assembly and to the manufacturing process. It is low in cost, being composed of elastically deformable but tough wear-resistant plastic, and it fulfills its function without danger of accidental displacement or loss under the impulse of vibration or shock loads.

The retaining means comprises a special collar and a cooperative cap, both composed of a molded plastic of the nylon or acetal type. These elements are preferably permanently connected by a flexible part which is integral with each of them. The collar is formed as a split ring and has special formations which cause it to function in the desired reliable manner. The cap is similarly of special configuration, and the relative dimensions and deformabilities of the parts are such that when the installation is made the collar is automatically locked to the core tube, and the retaining cap is locked to the collar.

The preferred way of achieving these objects and advantages, and such other benefits as may hereinafter be pointed out, is illustrated in the accompany drawings, in which—

FIG. 1 is a cross-sectional view of a solenoid assembly, with a retaining device of the improved character in partially applied relation thereto;

FIG. 2 is an enlarged cross-sectional view, in the same direction as FIG. 1, of the retaining means in its fully applied position;

FIG. 3 is a cross-section along the line 3—3 of FIG. 2;

FIG. 4 is a plan view of the retaining device by itself; and

FIG. 5 is a cross-section along the line 5—5 of FIG. 4.

The solenoid assembly shown in FIG. 1 comprises a housing 10 having opposed walls 11 and 12. Aligned openings are formed in these walls to allow the opposite ends of a core tube 13 to project outwardly beyond them.

The core tube shown encloses a plug nut 14. An armature or core 15 is movable toward and away from the part 14, the movements being controlled by a spring 16 and a solenoid winding 17 encircling the tube. In the arrangement chosen for illustration, the core movements are transmitted to a device to be controlled, e.g., a valve, through the open end of the core tube shown at the bottom of FIG. 1. The opposite or upper end is closed, as shown. It is this end which is engaged by the improved retaining device to prevent the tube end from retreating into the housing 10.

Adjacent to its closed end the core tube is peripherally contoured to provide a circumferential groove or equivalent reduction in diameter, the narrower part 18 lying directly adjacent to the housing wall 11. The device shown in FIGS. 4 and 5 is applicable to the core tube end to establish a firm engagement with the narrow part 18. It consists of a collar 19, and a retaining cap 20, these elements preferably forming integral parts of a single molded plastic element which includes the flexible connecting strap 21.

The plastic employed is tough, wear-resistant, and elastically deformable. Nylon is an example, but resins of the acetal type, and others, are also suitable.

The collar 19 is formed as a split ring, i.e., the collar is generally circular but there is a gap 22 which allows the diameter to diminish when the gap is closed. The gap 22 is preferably diametrically opposite to the region from which the connector 21 extends.

The connector 21 merges with the collar 19 at or very near one end of the collar (the lower end as shown in FIG. 5). At this end, the collar is provided with an inwardly directed rib or part 23. At the opposite end of the collar there is an outwardly extending bead 24, preferably of rounded contour as shown.

The collar 19 is so dimensioned, with respect to the core tube with which it is to be used, that it may be readily slipped over the core tube end as shown in FIG. 1, to encircle the tube end rather snugly and to locate the part 23 against the narrow part 18 of the tube end.

The cap 20 is shaped to fit over the collar 19 as shown in FIGS. 2 and 3. It is generally circular and defines an uninterrupted ring. It includes a cylindrical part or skirt 25 whose inner diameter is slightly less than the external diameter of the bead 24 on the collar 19. At the base of the skirt 25 there is an internal annular recess 26 adapted to accommodate the bead 24 when the cap is in place.

The cap 20 has an end wall 27 which overlies the tube end as shown in FIGS. 2 and 3. At the side opposite the connector 21 the cap may advantageously have a tab or peak 28 by means of which it may be readily grasped and manipulated. The edge of the skirt 25 is provided with a cut-out 29 to accommodate the strap 21 when the parts are fully assembled (see FIG. 2).

The use of the device is simple and expeditious, and requires no special tools. During the manufacturing process the parts are first assembled within the housing 10 and the open end of the core tube may be secured in any desired manner to the adjacent wall 12 of the housing, or to the valve or other unit on which the solenoid assembly is mounted. The collar 19 is then applied to the closed end of the core tube and the cap 20 is pressed down over it. During the latter step the skirt 25 squeezes past the bead 24 and snaps into a position in which the bead 24 rests snugly within the recess 26 while the skirt 25 presses inward upon the collar 19. The inner diameter of the skirt 25 should be about the same as the outer diameter of the collar after the gap 22 has been closed or almost closed. As a result, the inwardly extending part 23 on the collar 19 becomes locked to the tube end and the cap 20 is locked to the collar. Removal can be achieved only by deliberate intent; accidental separation, or displacement by vibrational or shock forces, is completely avoided. If the tab or peak 28 is omitted, the removal of the gripping device, even intentionally, becomes very difficult.

Among the advantages of the retaining device is the fact that it is composed of elastically deformable material, whereby it conforms itself to the parts it comes in contact with, thus compensating for any slack that may be present because of minute dimensional variations.

The top surface of the cap lends itself advantageously to the display of size indicia, instructional data, or a trademark or the like.

It will be understood that the device is intended to be manufactured in various sizes, for application to solenoid assemblies of different kinds. In some respects the invention is of wider applicability, and might be used for the general purpose of clamping or gripping any cylindrical part (e.g., a shaft or spindle) corresponding in external nature to the projecting core tube end herein described. Also, some of the details described and illustrated may be modified without necessarily departing from the spirit and scope of the invention as expressed in the appended claims.

What is claimed is:

1. In a solenoid assembly, a housing having opposed walls, said walls having aligned openings, a core tube within the housing and having its opposite ends projecting through said openings respectively, one projecting end having a circumferential groove directly adjacent to the housing, and means for clamping the housing to said tube, said means comprising a plastic collar composed of elastically deformable material and formed as a split ring snugly encircling said one projecting core tube end, said collar being provided at the end nearer the housing with an inwardly extending part that bears against said groove, said collar being provided at the end remote from the housing with an outwardly extending bead, and a retaining cap of similar material applicable to the collar and having a skirt whose inner diameter is less than that of said outwardly extending bead, said skirt having at its base an inner annular recess adapted to accommodate said bead, the forcible application of said cap to said collar causing said skirt to squeeze past said bead and snap into a position in which it exerts inward pressure upon said inwardly extending part, thereby locking the collar to the core tube and locking the cap to the collar.

2. A solenoid assembly as defined in claim 1, in which said cap is provided with an end wall that overlies the end of the core tube when it is in locking position.

3. A solenoid assembly as defined in claim 1, in which said cap is secured to said collar by a flexible connecting part integral with both the cap and the collar.

4. A solenoid assembly as defined in claim 3, in which said skirt is provided with a cut-out to accommodate said connecting part when the cap is in its locking position.

References Cited by the Examiner

UNITED STATES PATENTS

| | | | |
|---|---|---|---|
| 2,627,544 | 2/1953 | Eck | 317—191 X |
| 2,894,654 | 7/1959 | Lohrer | 215—99 X |
| 3,017,547 | 1/1962 | Jencks | 317—191 |

BERNARD A. GILHEANY, *Primary Examiner.*

GEORGE HARRIS, Jr., *Assistant Examiner.*